United States Patent [19]

Katayama

[11] Patent Number: 5,113,184
[45] Date of Patent: May 12, 1992

[54] METHOD AND SYSTEM OF COMMUNICATION FOR A NON-CONTACT IC CARD

[75] Inventor: Yousuke Katayama, Toride, Japan

[73] Assignee: Hitachi Maxell, Ltd., Osaka, Japan

[21] Appl. No.: 704,841

[22] Filed: May 20, 1991

Related U.S. Application Data

[63] Continuation of Ser. No. 247,856, Sep. 22, 1988, abandoned.

[30] Foreign Application Priority Data

Sep. 22, 1987 [JP] Japan ................ 62-238212
Oct. 15, 1987 [JP] Japan ................ 62-260425
Nov. 10, 1987 [JP] Japan ................ 62-282202

[51] Int. Cl.$^5$ .................. H04Q 7/00; G06K 7/00
[52] U.S. Cl. .................... 340/825.54; 340/825.34; 340/825.71; 235/382.5
[58] Field of Search .............. 340/825.54, 825.33, 340/825.34, 825.71, 531, 825.72; 902/4, 5; 235/379, 380, 382, 382.5, 449, 450

[56] References Cited

U.S. PATENT DOCUMENTS

| | | | |
|---|---|---|---|
| 4,353,064 | 10/1982 | Stamm | 902/4 |
| 4,546,241 | 10/1985 | Walton | 235/380 |
| 4,605,844 | 8/1986 | Haggan | 235/380 |
| 4,665,399 | 5/1987 | Fauser et al. | 340/825.71 |
| 4,752,776 | 6/1988 | Katzenstein | 340/825.54 |
| 4,807,140 | 2/1989 | Saulnier | 340/825.54 |
| 4,888,585 | 12/1989 | Kamiya et al. | 340/825.54 |
| 4,893,118 | 1/1990 | Lewiner et al. | 340/825.34 |

OTHER PUBLICATIONS

Great Britain Patent Application 2,177,528 to Ohki dated Jan. 21, 1987.
European Patent Application 204,542 to Bertenshaw et al., 12/10/86.
European Search Report Application No. EP 88 30 8709, 7/6/89.

Primary Examiner—Donald J. Yusko
Assistant Examiner—Peter Weissman

[57] ABSTRACT

A data communication system includes an external unit, such as a card reader/writer, with the ability of reading and writing data for a recording medium. The recording medium, such as an IC card, transacts signals with the external unit by being coupled electromagnetically in non-contact fashion with the external unit and is supplied power from the external unit. The external unit includes a first data processor, a first electromagnetic transducing coil for the electromagnetic coupling with the medium, a carrier wave generator connected to the first coil for generating a carrier for transmitting a signal to the recording medium, and a received signal discriminator. The recording medium includes a second data processor, a second electromagnetic transducing coil for the electromagnetic coupling with the external unit, a switching circuit connected to the second coil for varying the load impedance of the second coil in response to a signal to be sent to the first coil, and a received signal detecting circuit. The data signal from the recording medium is demodulated for the carrier frequency from the external unit in response to the data signal, and transmitted to the external unit. The recording medium includes circuits which detect a variation in the power voltage supplied through the electromagnetic coupling and feed it back electromagnetically to the external unit.

13 Claims, 5 Drawing Sheets

METHOD AND SYSTEM OF COMMUNICATION FOR A NON-CONTACT IC CARD

This application is a continuation of application Ser. No. 07/247,856 filed on Sept. 22, 1988, now abandoned.

BACKGROUND OF THE INVENTION

This invention relates to a non-contact, magnetically-coupled communication technique, and particularly to an improved method and system of communication for a non-contact IC card.

Communication of data between a non-contact IC card and a data reader/writer (or a host system), such as a host computer or an IC card reader/writer (will be termed simply "reader/writer" hereinafter), takes place through the provision of a transmission circuit and a reception circuit on both sides of the data reader/writer and the IC card.

In case of communication by non-contact, electromagnetic coupling between the IC card and the reader/writer, the transmission circuits on both sides need to have a carrier generating circuit for producing a signal transmission carrier wave. Thus, the circuit is considerably complex. Therefore, it is difficult to make the circuit more compact and make the card thinner.

SUMMARY OF THE INVENTION

An object of this invention is to provide a data communication system which links a data reader/writer to a recording medium such as an IC card on the basis of non-contact, electromagnetic coupling, with the intention of eliminating the need for an oscillation source on the part of the recording medium and simplifying the circuit.

Another object of this invention is to provide a data communication system based on non-contact, electromagnetic coupling, in which a functional recording medium has its power voltage, which is supplied through electromagnetic coupling from the external equipment, easily stabilized on the part of the external equipment.

In order to achieve the above objectives, the inventive non-contact, electromagnetically coupled communication system includes a first transceiver and a second transceiver in non-contact, electromagnetic coupling. The first transceiver includes a first electromagnetic transducer used for the electromagnetic coupling with the second transceiver and a carrier generating circuit in connection with the transducer for producing a carrier wave for transmitting a signal to the second transceiver. The second transceiver includes a second electromagnetic transducer used for electromagnetic coupling with the first transducer and a circuit in connection with the second transducer operating so as to vary the load impedance of the second transducer in response to a signal transmitted to the first transceiver, wherein the first transceiver receives a signal from the second transceiver by detecting a change in the frequency of the carrier of the signal.

In the case of one IC card system, as an embodiment of this invention, the above-mentioned second transceiver is an IC card. In that IC card is included a power source circuit which provides power by transforming a field of electromagnetic energy into a d.c. power voltage or owes the power source to a battery. Further, a coil is provided which is placed in the electromagnetic field produced by an oscillation circuit of the reader/writer and a circuit which detects and rectifies the energy captured by the coil to produce a signal. A further circuit is provided which connects or disconnects (ON/OFF) the coil so that the resonant frequency of the space is varied as well as a circuit which implements data processing, so that the whole IC card circuit operates on the power provided by the power source circuit. The above-mentioned first transceiver is an IC card reader/writer, with the provision of a reader/writer or host computer. In that IC card is included, an oscillation circuit which produces a carrier modulated by a signal to be sent to the IC card, and a frequency comparison circuit which demodulates a change in the carrier frequency.

Namely, the carrier generating circuit and frequency comparison circuit are placed on a portion of the reader/writer, while the circuit for detecting energy on the coil and rectifying it into data and the circuit for connecting or disconnecting the coil are placed on a portion of the IC card. In transmitting data from the reader/writer to the IC card, the oscillation circuit is operated, energy is received on the coil, and the oscillation circuit is connected or disconnected. In transmitting data from the IC card to the reader/writer, the oscillation circuit is kept operating and the coil is disconnected (e.g., grounded) in compliance with the transmitted data. This is so that a change in the oscillation frequency caused by the impedance variation, is entered into the frequency comparison circuit which releases reception data on the basis of the oscillation frequency variation.

As described, the second transceiver varies the impedance of the electromagnetic transducer of the first transceiver to thereby vary the resonant frequency of the carrier generator. Thus, the second transceiver can have data transmission to the first transceiver without the need of having an oscillation circuit. Consequently, the second transceiver has its transmission circuit simplified with a fewer number of component parts, thereby resulting in improved reliability. Further, it is especially suitable when applied to IC cards.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of this invention will be described with reference to the drawings.

Figure 1:
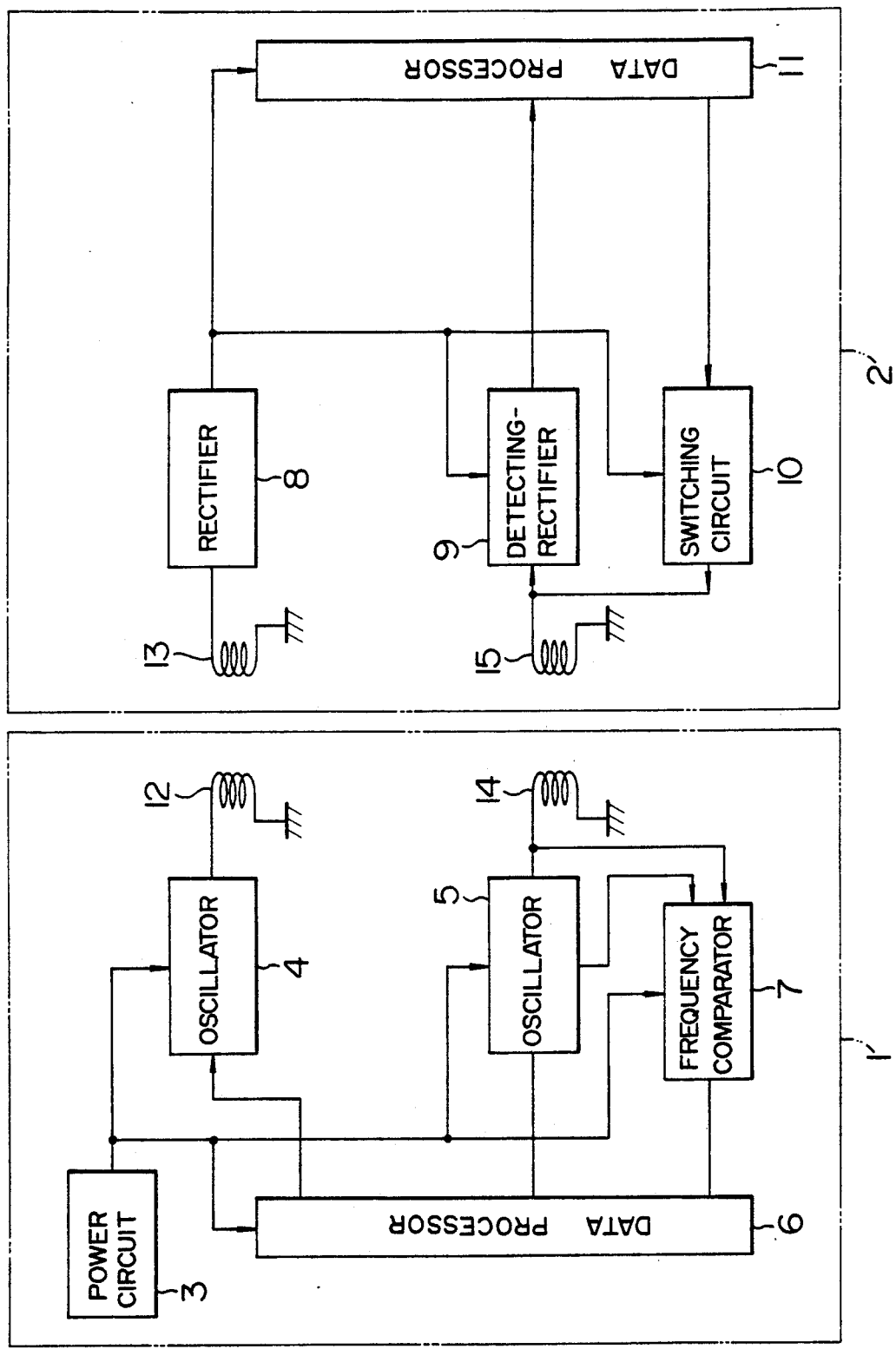
FIG. 1 is a block diagram showing the communication for a non-contact IC card to which is applied the inventive non-contact, electromagnetically coupled communication system.

FIG. 1 is a block diagram showing the communication for a non-contact IC card to which the inventive non-contact, electromagnetically coupled communication system is applied. In FIG. 1, indicated by 1 is an IC card reader/writer which accepts a non-contact IC card (will be termed simply "IC card" hereinafter) 2. The IC card 2 is supplied with its operating power from an oscillation circuit 4 of the reader/writer 1 on its receiving coil 13. The receiving coil 13 is in non-contact, electromagnetic coupling with a sending coil 12 of the reader/writer 1. The oscillation circuit 4 supplies a signal of around 200 kHz, for example, to the sending coil 12. It is received by the receiving coil 13 in the form of the electromagnetic field, and thus power is transferred. The power received on the receiving coil 13 is transformed into a d.c. voltage by a rectifying circuit 8 and distributed to the whole circuit in the IC card 2. Indicated by 3 is a power circuit provided in the reader/writer 1. It supplies power to its whole circuit.

On the other hand, the reader/writer 1 transmits data to the IC card 2 from a data processor 6 including a microprocessor or similar type device, by way of an associated oscillation circuit 5 and transceiving coil 14. The oscillation circuit 5 generates a carrier of around 10 MHz, for example, which is turned on and off for output by the transmission data provided by the data processor 6. Namely, data transmission is based on a "tone burst" mode.

The tone-burst data transmitted in the form of electrometnetic field from the transceiving coil 14 is received by a transceiving coil 15 of the IC card 2 which is in a non-contact, electromagnetic coupling with the coil 14. After it is demodulated into a digital signal by a detecting rectifier 9, it is sent to the data processor 11 incorporating a microprocessor or similar type device. Data transmission from the IC card 2 to the reader/writer 1 takes place while the oscillation circuit 5 of the reader/writer 1 is kept operating. A switching circuit 10, located at the node of the transceiving coil 15 and detecting rectifier 9 of the IC card 2, is operated such that the coil 15 is connected or disconnected in accordance with data to be transmitted.

The on-off control of the switching circuit 10 operates such that when it is "on", a bias voltage or power voltage is applied to the terminal of the coil 15 in connection to the detecting rectifier 9 so that a d.c. current flows. Further, the terminal is grounded when it is "off". The "on" state causes the transceiving coil 15 to produce a d.c. magnetic flux. This flux vanishes when the coil is in an "off" state. The on-off control varies the impedance of the magnetic circuit of the transceiving coil 14, thereby causing the oscillation circuit 5 to vary the output frequency.

Another method of varying the impedance of the magnetic circuit occurs by the transceiving coil 15 being disconnected at its one terminal from the detecting rectifier 9 so that the coil 15 is open during the "off" state. Further, the terminals of the coil are connected directly or through a resistor during the "on" state. During the on-off control of the switching circuit 10, the transceiving coil 15 does not operate as a magnetic flux generating circuit, as was the previous case. It merely functions as a magnetic coupling circuit for varying the impedance of a magnetic circuit by being coupled electromagnetically with the transceiving coil 14.

The on-off control of the switching circuit 10 varies the output frequency of the oscillation circuit 5, which is detected by a frequency comparison circuit 7, and the transmitted data is demodulated.

Based on the electromagnetic coupling between the transceiving coils 14 and 15, a change in the load impedance of the transceiving coil 15 is transferred as a signal to the transceiving coil 14, and it modulates the output signal of the oscillation circuit 5. As a result, a signal with a varying frequency is produced on the terminal of the oscillation circuit 5 in connection with the transceiving coil 14.

The varying frequency is compared by the frequency comparison circuit 7 with a reference carrier frequency provided by the oscillation circuit 5, so that the transmitted data from the IC card 2 is detected. Further, the carrier signal is modulated in accordance with the detected data to retrieve the transmitted data. The reference carrier frequency signal is produced by the resonator or the peripheral circuit in the oscillation circuit 5, or by a separate clock oscillator or similar circuit. The detected data is delivered to the data processor 6 in the reader/writer 1, and the data transmitted from the IC card 2 is processed.

Figure 2:
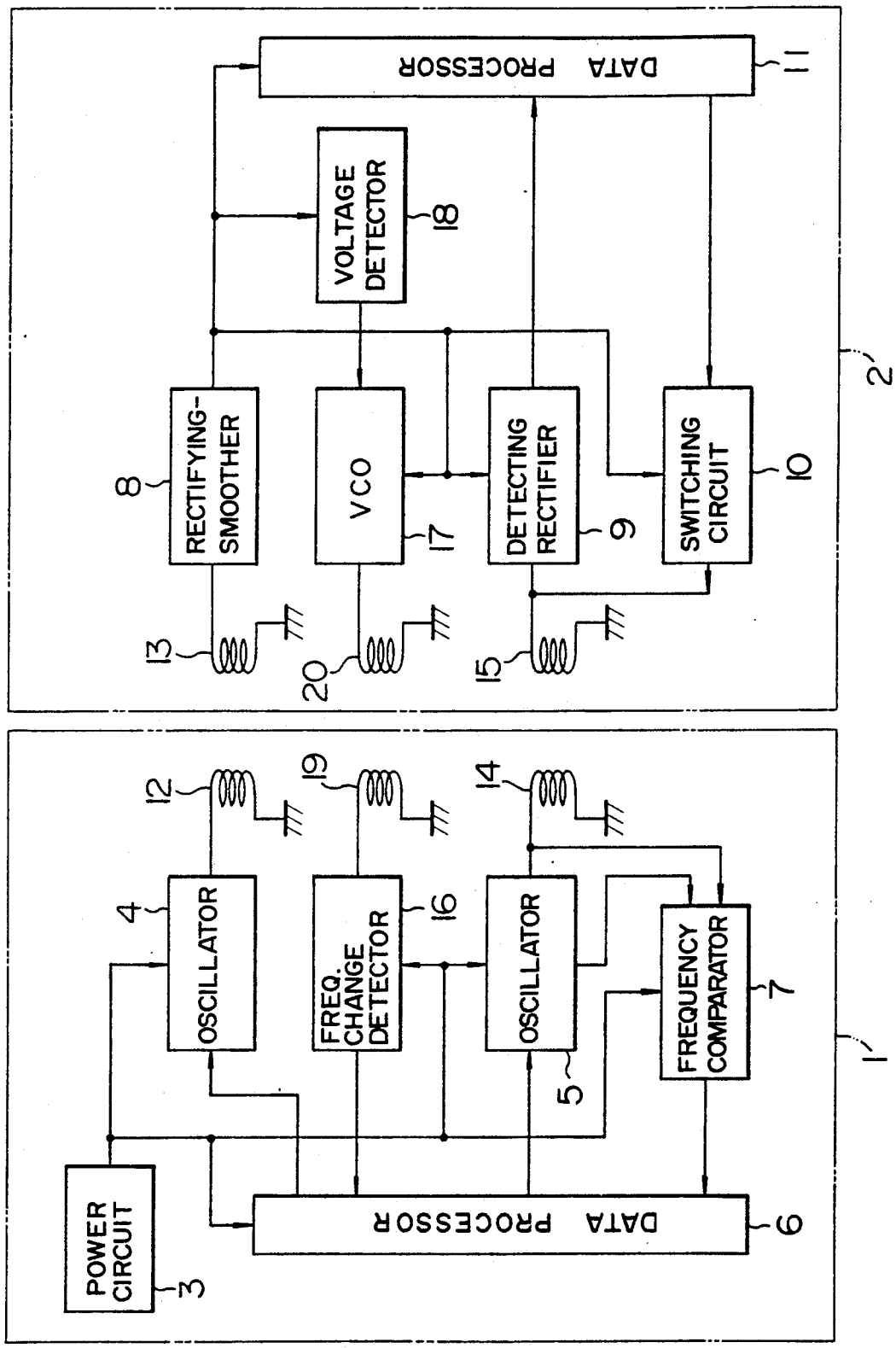
FIG. 2 is a block diagram showing the communication for a non-contact IC card, which employs a different power supply system, to which the inventive non-contact, electromagnetically coupled communication system is applied.

FIG. 2 is a block diagram showing the inventive non-contact, magnetically coupled communication system applied to a non-contact IC card of a different power supply system. In FIG. 2, indicated by 1, is a reader/writer which accepts an IC card 2. The IC card 2 is supplied with its operating power from an oscillation circuit 4 of the reader/writer 1 on its receiving coil 13, which is in non-contact electromagnetic coupling with a sending coil 12 of the reader/writer 1. The oscillation circuit 4 supplies a signal of around 200 kHz, for example, to the sending coil 12 and it is received in the form of the magnetic field by the receiving coil 13. Thus, power is transferred. The power received on the receiving coil 13 is transformed into a d.c. power by a rectifying-smoothing circuit 8, which is a power circuit in the IC card 2. It is then distributed to the whole circuit in the IC card 2. Indicated by 3 is a power circuit, provided in the reader/writer 1, which supplies power to its whole circuit.

Indicated by 18 is a voltage detection circuit which monitors the output voltage of the rectifying-smoothing circuit 8 and produces a control voltage. By this circuit, the oscillation frequency of a voltage-controlled oscillator (VCO) 17 is controlled. The VCO 17 delivers its output signal, with the controlled frequency, to a sending coil 20. Consequently, the signal produced by the VCO 17 is transmitted to a receiving coil 19 of the reader/writer 1 in magnetic coupling with the sending coil 20, and the signal received on the coil 19 is detected by a frequency change detection circuit 16. This generates data, in compliance with the frequency variation of the received signal, which is delivered to the data processor 6 incorporating a microprocessor or the like. Upon receiving the data, the data processor 6 issues a control signal to the oscillation circuit 4 so that its output voltage level is stabilized.

Next, the power voltage control in the IC card 2 will be described. If the IC card 2 and reader/writer 1 have a decreased gap therebetween, or the IC card has a decreased power consumption, the output voltage of the rectifying-smoothing circuit 8 will rise. Upon detecting a rising voltage, the voltage detection circuit 18 issues a corresponding control signal to the VCO 17. The VCO 17 in turn oscillates at a frequency higher than the reference oscillation frequency.

The high-frequency signal is received by the frequency change detection circuit 16 by way of the sending coil 20 and receiving coil 19. The frequency change detection circuit 16 incorporates a frequency comparison circuit and an oscillator tuned to the reference frequency of the VCO 17. The circuit 16 compares the frequency received on the receiving coil 19 with the reference frequency of the VCO 17, and produces a digital signal which represents an up-offset value from the reference frequency. It then sends it to the data processor 6. The data processor 6 is informed of a rising power voltage of the IC card 2 by receiving the data, and issues a control signal to the oscillation circuit 4 so that its output level is lowered.

Next, if the IC card 2 and reader/writer 1 have an increased gap therebetween, or the IC card has an increased power consumption, the output voltage of the rectifying-smoothing circuit 8 will fall. Upon detecting a falling voltage, the voltage detection circuit 18 issues a corresponding control signal to the VCO 17. The VCO 17 in turn oscillates at a frequency lower than the reference frequency. The low frequency signal is received by the frequency change detection circuit 16 by way of the sending coil 20 and receiving coil 19 in the same manner as above. The frequency change detection circuit 16 produces a digital signal which represents a down-offset from the reference frequency and sends it to the data processor 6. The data processor 6 is informed of the falling power voltage of the IC card 2 by receiving the data, and issues a control signal to the oscillation circuit 4 so that it raises the output level.

In this way, a variation in the power voltage of the IC card 2 is compensated by adjusting the supply of electromagnetic energy accordingly, and the IC card power voltage is stabilized.

The oscillation circuit 4 and sending coil 12 are a specific example of the electromagnetic transducer, and the receiving coil 13 is a specific example of electromagnetic transducers which convert electromagnetic energy into electrical energy. The VCO 17 is a specific example of a control signal generation circuit, and the sending coil 20 is a specific example of a control signal transmission circuit. The receiving coil 19 and frequency change detection circuit 16 are a specific example of control signal receiving circuits of this invention, and the data processor 6 is a specific example of a control circuit.

The voltage detection circuit 18 is specifically a voltage comparison circuit or a voltage level conversion circuit, and generally it can be formed of operational amplifiers or transistor circuits without including capacitors. Therefore, it can be formed as an integrated circuit. The voltage detection circuit 18, when it is based on voltage comparison for example, employs two voltage comparators which produce detection signals at the upper and lower voltage levels. In response to the upper limit or lower limit detection signals, the VCO 17 is controlled to raise or lower the oscillation frequency from the reference oscillation frequency. On the other hand, the voltage detection circuit of the voltage level conversion mode will be a circuit which converts the output voltage of the rectifying-smoothing circuit 8 into the voltage control level of the VCO 17. If the VCO 17 can be controlled directly by the output of the rectifying-smoothing circuit 8, the voltage detection circuit 18 may be omitted.

Although in this embodiment a VCO is used, it may be replaced with any oscillation circuit which can operate at a higher and lower frequencies with respect to the reference frequency. Although in this embodiment the supplied electromagnetic energy is controlled so that the voltage variation is offset, an alternative scheme is to set the power circuit to produce a higher voltage thereby to supply a larger energy from the reader/writer and to stabilize the voltage, as in a voltage stabilization based on a zener diode, in the voltage detection circuit. This allows one-way control and simplifies the circuit arrangement.

For example, when a voltage comparison circuit is used for the voltage detection circuit, it is set to a higher voltage level and designed to produce a control signal for a certain lower voltage level. In this case, for example the voltage comparison circuit needs only one threshold level. Similarly, in the case of using a level conversion circuit, the circuit is merely required to control the frequency adjustment to the higher or lower level, with respect to the reference value. For the frequency generation as a signal of regulating the voltage, it is of course possible to generate a lower value for a high voltage, or conversely a higher value for a low voltage.

Although, in this embodiment, the signal for adjusting the energy is sent as an oscillation frequency of VCO to the reader/writer, it may be data which simply corresponds to the current voltage value. In this case, a circuit may be provided to convert a detected voltage value or its deviation from the reference voltage value into a digital value so that a precise digitized power supply adjustment signal is sent to the reader/writer.

Although this embodiment is a communication system for an IC card through a reader/writer, this invention is applicable to general recording media including memory cards. Further, the partner equipment can be general external facilities such as a host computer.

Figure 3:
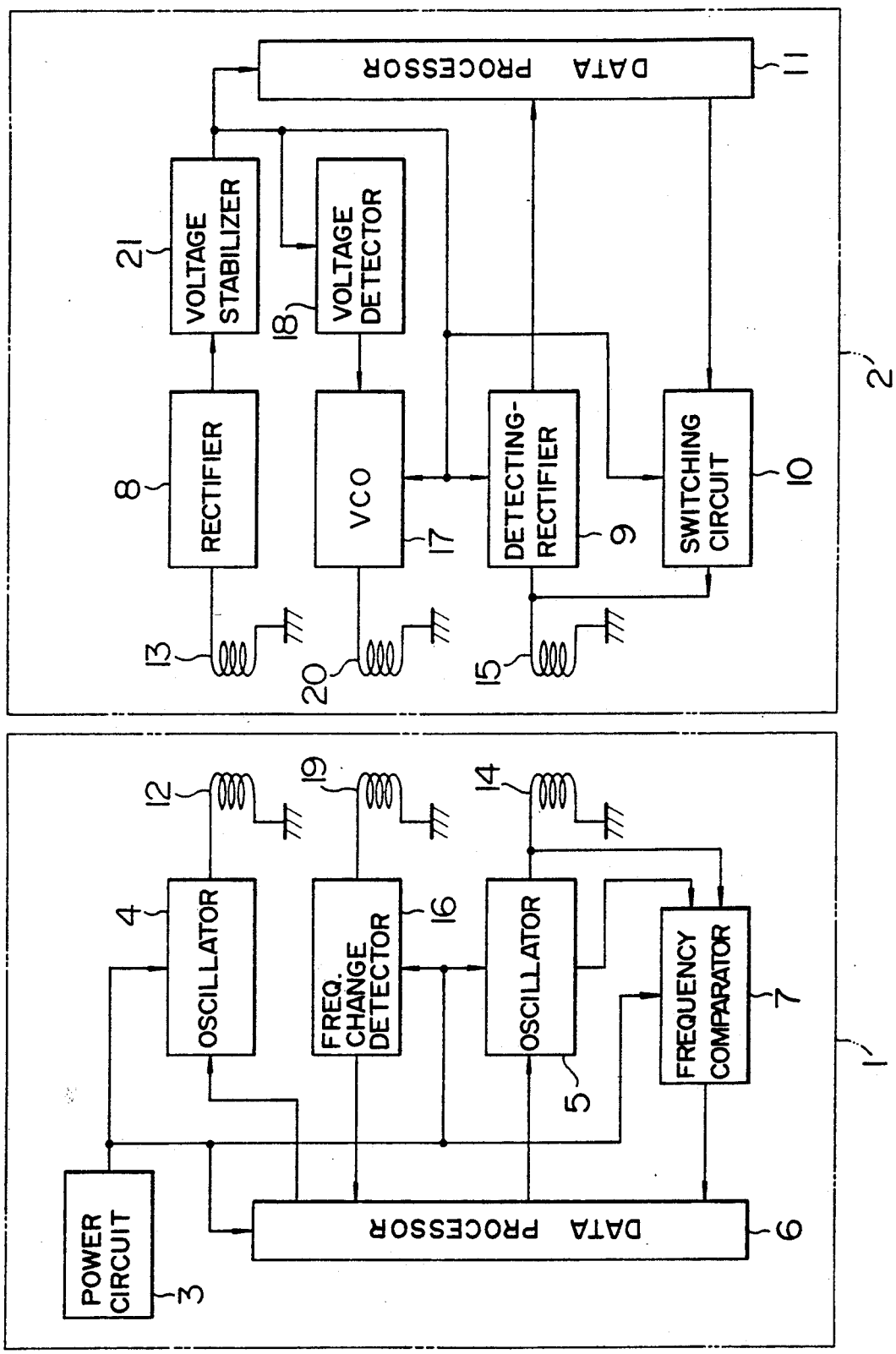
FIG. 3 is a block diagram showing the communication for a non-contact IC card, which employs a still different power supply system, to which the inventive non-contact, electromagnetically coupled communication system is applied.

As shown in FIG. 3, by placing a voltage stabilizer 21 between the rectifying-smoothing circuit 8 and voltage detection circuit 18 in the non-contact card in FIG. 2, it is possible that a small fluctuation of the IC card power voltage at the first stage is regulated by the stabilizer 21. Also, a larger fluctuation in excess of this regulation range is offset by adjusting the supplied electromagnetic energy, thereby maintaining the power voltage of the IC card 2 constant. Such a 2-stage regulation allows a smaller capacitor in the smoothing circuit and a smaller current setting value at the steady-state operating point of the voltage stabilizer 21. Thus, the overall power circuit has a decreased heat dissipation.

Although in this embodiment the power circuit for the IC card 2 is formed of an electromagnetic transducing circuit, it may use solar cells or supersonic energy, or may be of a built-in battery type.

Although in this embodiment a comparison circuit is used to detect the variation of frequency, an alternative scheme is that transmitted data is detected by extracting a specific frequency through the filtering or a similar process and the data is demodulated through the waveform shaping. Any circuit capable of detecting a frequency variation may be used.

Although in this embodiment the IC card has been described mainly, it can of course be applied to various information recording media such as memory cards incorporating a microprocessor or the like and memory cartridges. Furthermore, the invention is also applicable to non-contact, electromagnetically coupled communication systems intended for the communication between facilities in general based on the non-contact, electromagnetic coupling.

Figure 4:
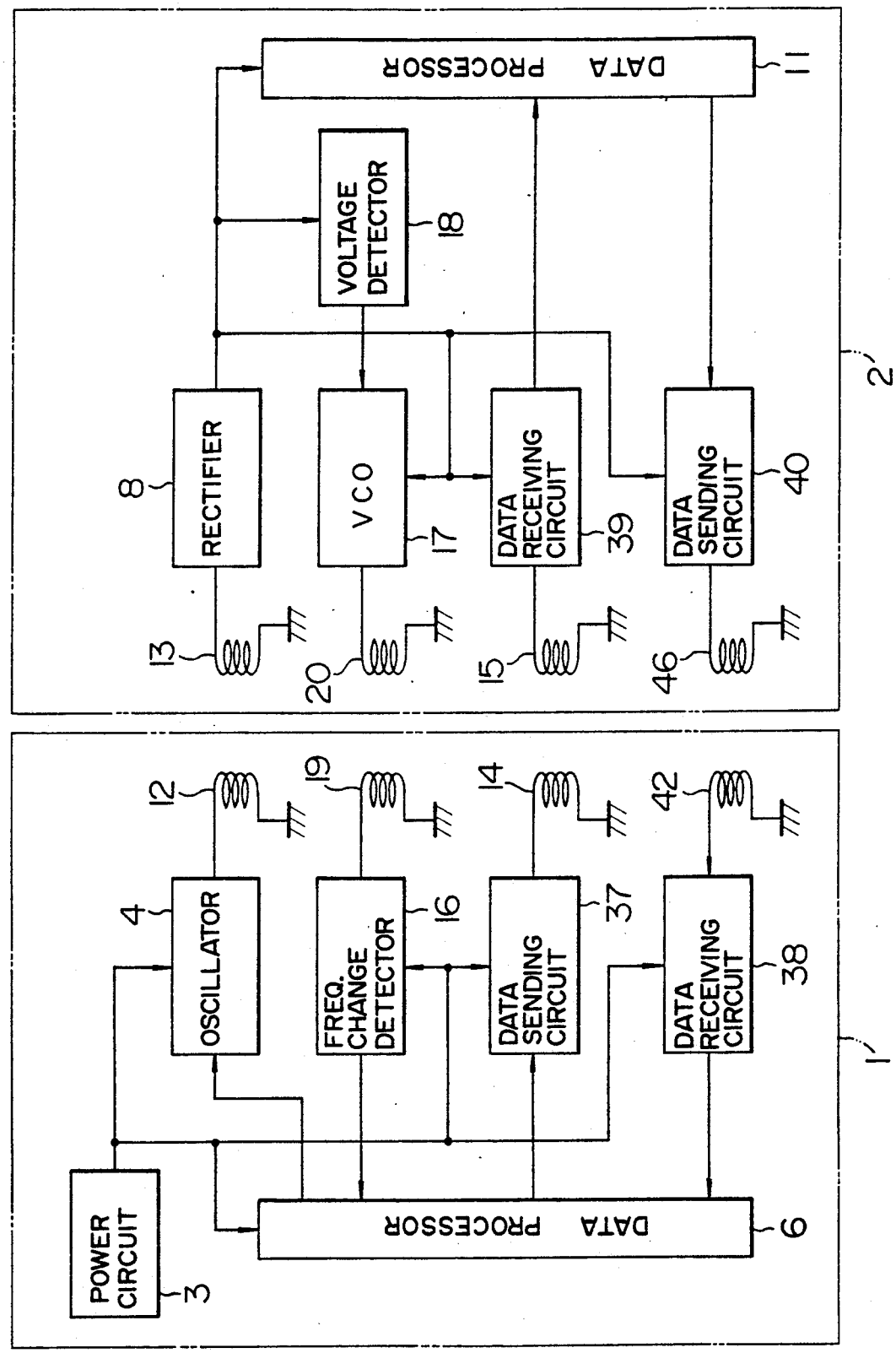
FIGS. 4 and 5 are block diagrams showing other embodiments of this invention.

FIG. 4 shows a variation of the embodiment shown in FIG. 2, and the following describes the differences of the system from the preceding embodiment. Both embodiments have the same power supply system. In transmitting data from the reader/writer 1 to the IC card 2, the data processor 6 sends the data through a data transmission circuit 37 and sending coil 14 to the IC card 2. The data transmission circuit 37 generates a carrier with a frequency of around 10 MHz for example. The carrier is modulated in on/off mode by the data transmitted from the data processor 6. In this case, data transmission is of so-called tone-burst mode. The tone-burst data transmitted in the form of electromagnetic field through the sending coil 14 is received by the receiving coil 15 of IC card 2 in non-contact magnetic coupling with the coil 14. Further, after it is demodulated into a digital signal by a data receiving circuit 39, it is delivered to the data processor 11 incorporating a microprocessor or the like.

Data transmission from the IC card 2 to the reader/writer 1 is carried out by a data transmission circuit 40 by way of a sending coil 46. Digital data sent out of the data processor 11 is received by the data transmission circuit 40, which supplies a tone-burst signal to the sending coil 46 in the same manner as of the above-mentioned data transmission circuit 37. The signal is received by a receiving coil 42 of reader/writer 1 in electromagnetic coupling with the coil 46, demodulated by a data reception circuit 38. After it is transformed into a digital signal, it is delivered to the data processor 6.

Figure 5:
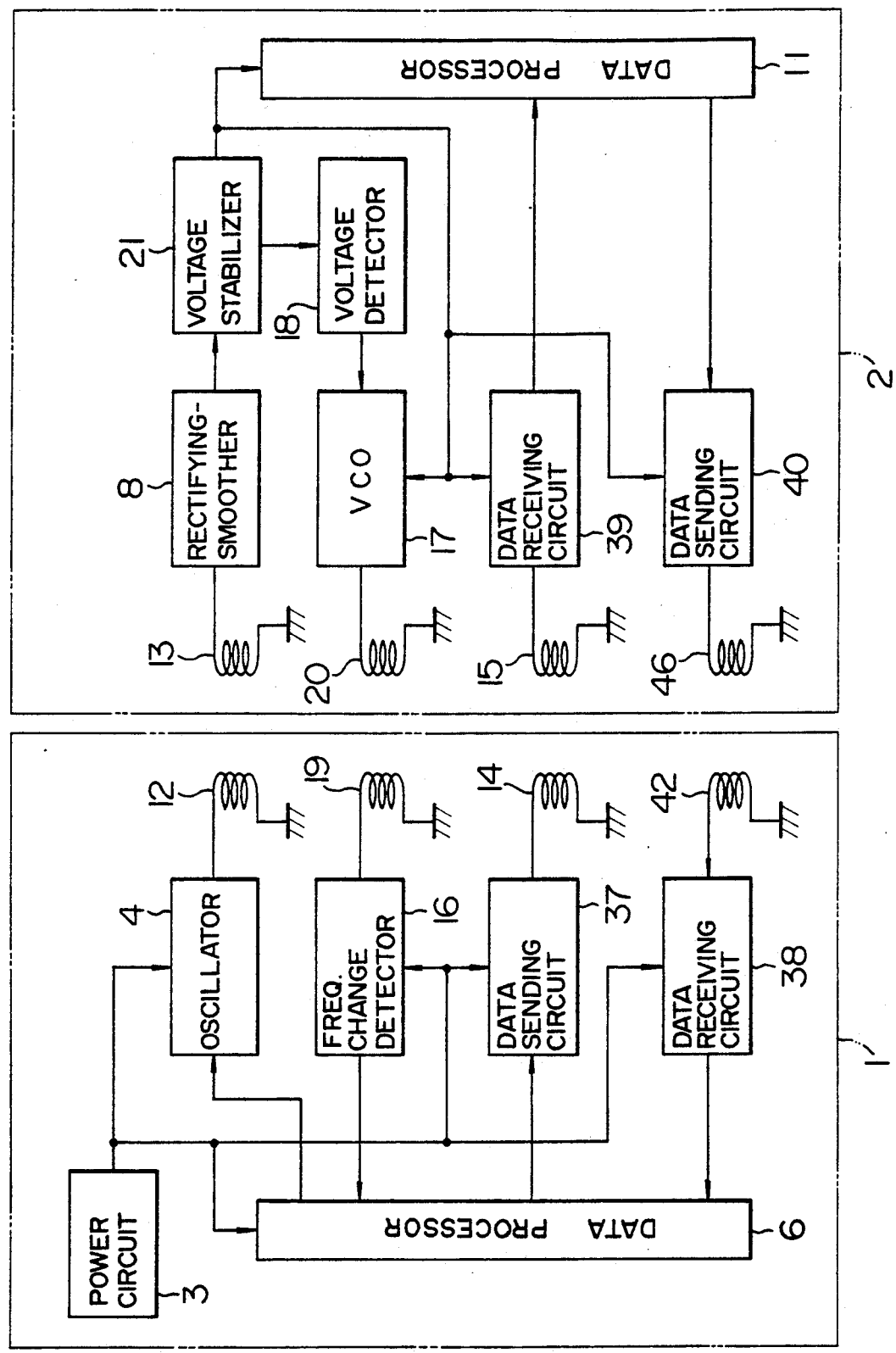

FIG. 5 shows a modification of the embodiment shown in FIG. 4. Similar to the power supply circuit of FIG. 3, a voltage stabilizer 21 is added between the rectifying-smoothing circuit 8 and the voltage detection circuit 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A non-contact, electromagnetically coupled communication system comprising:
   a first communicating unit and a second communicating unit coupled electromagnetically in non-contact fashion for communicating signals therebetween,
   said first communicating unit comprising,
      first electromagnetic transducing means having a single bi-directional transceiving coil for establishing electromagnetic coupling with said second communicating unit for subsequent signal communication; and
      carrier wave generating means, connected to said first electromagnetic transducing means, for generating a tone burst signal, including a carrier wave signal of a constant frequency, for data transmission to said second communicating unit,
   said second communicating unit comprising,
      second electromagnetic transducing means having a single bi-directional transceiving coil for establishing electromagnetic coupling with said first electromagnetic transducing means, for receiving said tone burst signal and for transmitting a data signal, and
      switching means connected to said second electromagnetic transducing means, for varying the impedance of said second electromagnetic transducing means, when activated in accordance with transmission of a data signal to said first communicating unit from said second communicating unit,
   said second electromagnetic transducing means modulating the frequency of said previously constant frequency carrier wave signal, upon said impedance being varied, to transmit the data signal,
   said first communicating unit further including detection means, responsive to operation of said switching means, for detecting reception of said data signal by detecting the modulation in the frequency of said previously constant frequency carrier wave, caused by variation of the impedance of said second electromagnetic transducing means.

2. A system according to claim 1, wherein said first communicating unit comprises a data write-and-read unit and said second communicating unit comprises an IC card, said switching means of said second communicating unit including means for creating the variation in a load impedance of said single bi-directional transceiving coil of said second electromagnetic transducing means, in accordance with transmission of a data signal, by grounding or opening the connection of said single bi-directional transceiving coil of said second electromagnetic transducing means, with the remainder of said second transducing means.

3. A system according to claim 2, wherein said detection means of said first communicating unit further comprises comparison means for comparing the carrier wave frequency of said received signal of the first electromagnetic transducing means from the second electromagnetic transducing means, with a reference carrier wave frequency equal to the constant carrier wave frequency of said carrier generating means, to detect a modulation in the carrier frequency, indicating reception of a data signal.

4. A non-contact data communication system including an external unit with the ability to communicate signals, for reading or writing data, from or to a recording medium, the recording medium transacting with said external unit by being coupled electromagnetically in non-contact fashion and being supplied with power from the external unit, said external unit comprising,
   power supply means for generating and supplying power in the form of electromagnetic energy to said recording medium,
   control signal receiving means for receiving a power control signal, indicating the amount of electromagnetic energy received by said recording medium,
   control means for controlling the amount of electromagnetic energy generated and supplied by said power supply means in response to the power control signal from said receiving means,
   first electromagnetic transducing means, having a single bi-directional transceiving coil, for establishing electromagnetic coupling with said recording medium,
   carrier wave generation means connected to said first electromagnetic transducing means, for generating a tone burst signal for data transmission, including a carrier wave signal of a constant frequency, to said recording medium; and said recording medium comprising, transducing means for converting electromagnetic energy received from said power supply means into electrical energy, power means for producing a d.c. power voltage from the electrical energy received from said transducing means, power control signal generation means for generating said power control signal at a frequency correlated to the d.c. power voltage of said power means, control signal output means, electromagnetically coupled with said control signal receiving means, for outputting said power control signal, second electromagnetic transducing means having a single bi-directional transceiving coil for establishing said electromagnetic coupling with said first electromagnetic transducing means, and means, connected to said second electromagnetic transducing means, for varying the load impedance of said electromagnetic transducing means, to modulate the frequency of the carrier wave signal, to transmit a data signal via the electromagnetic transducing means, said external unit receiving the data signal transmitted from said recording medium by detecting a modulation in the frequency of said previously constant frequency of the carrier wave signal and controlling said power supply means of said external unit, based upon said power control signal, to maintain the d.c. power voltage of said power means constant.

5. A system as claimed in claim 4, further comprising voltage stabilizing means for maintaining a constant output voltage of said power means and said control signal generation means of said recording medium.

6. A non-contact data communicating system comprising:

an external unit with the ability to communicate signals for reading or writing data, from or to a recording medium and the recording medium for transacting signals with the external unit by being coupled electromagnetically in non-contact fashion with the external unit and being supplied with power from said external unit, said external unit comprising, power supply means for generating and supplying power in the form of electromagnetic energy to said recording medium, control signal receiving means for receiving a power control signal, indicating the amount of electromagnetic energy received by said recording medium, and control means for controlling the amount of electromagnetic energy generated and supplied by said power supply means in response to the power control signal from said control signal receiving means; and said recording medium comprising, electromagnetic transducing means for converting electromagnetic energy received from said power supply means into electrical energy, power means for producing a d.c. power voltage from the electrical energy received from said transducing means, control signal generation means for generating said power control signal at a frequency correlated to the d.c. power signal voltage of said power means, and control signal output means for outputting said power control signal by being coupled electromagnetically with said control receiving means, at least said control signal generation means being an integrated circuit operating to control said control means of said external unit using said power control signal so that the output d.c. power voltage of said power means is maintained constant.

7. A system according to claim 6 further comprising, voltage stabilizing means for controlling said power means to produce a constant output voltage and for supplying power to the whole circuit of said recording medium, and means for supplying said output voltage to said control signal generating means to that said control signal generating means produces a control signal in response to said output voltage of said voltage stabilizing means.

8. A system according to claim 6, wherein said control signal generating means comprises a voltage detecting means for detecting a voltage of said power means and produces said control signal in response to the voltage detected by said voltage detecting means.

9. A system according to claim 8, wherein said external unit comprises an IC card reader-writer, said recording medium comprises an IC card, said electromagnetic field generation means comprises an oscillation circuit and a coil, and said control signal output means comprises a coil, and said control signal generating means comprises a voltage-controlled oscillation circuit and a voltage detecting means for detecting a voltage of said voltage stabilizing means, said voltage detecting means producing a control voltage for said voltage-controlled oscillation circuit.

10. A functional recording medium which is coupled electromagnetically in non-contact fashion with an external unit, which implements data reading and writing for the recording medium, the recording medium being adapted to transact signals with said external unit by being supplied with power from said external unit, said recording medium comprising, data processing means for generating a data signal, a first electromagnetic transducing coil, being a single coil for both transmitting and receiving data, for establishing electromagnetic coupling with a second electromagnetic transducing coil, being a single coil for both transmitting and receiving data, of said external unit, and adapted to transmit an external signal from said external unit to said data processing means, and signal modulating means connected to said first electromagnetic transducing coil, for varying the impedance of said first electromagnetic transducing coil, when activated in response to a data signal generated by said data processing means, said first electromagnetic transducing coil, when coupled electromagnetically with said second electromagnetic transducing coil of said external unit, modulating the frequency of a carrier signal of a previously transmitted tone burst signal and enabling said external unit to detect a transmitted data signal, upon detection of the modulation in the frequency of a previously constant frequency of the carrier wave signal, generated by said external unit, the frequency modulation of the carrier wave signal of said external unit being caused by said impedance variation of said first electromagnetic transducing coil.

11. A method of data communication for a communication system in which a first communicating unit and a second communicating unit are coupled electromagnetically in non-contact fashion for transacting signals, said method comprising the steps of:

generating a tone burst signal for data transmission, including a carrier wave signal of a constant frequency, for data transmission to said second communicating unit;

supplying said tone burst signal, including said carrier wave signal, to a single bi-directional electromagnetic transceiving coil of said first communicating unit and supplying an electromagnetically converted carrier wave signal to a second single bi-directional electromagnetic transceiving coil of said second communicating unit;

varying the impedance of said second signal bi-directional electromagnetic transceiving coil of said second communicating unit, by means of activation of a switch, in accordance with transmission of a data signal to said first communicating unit; and detecting a modulation of the previously constant frequency of said carrier wave, caused by the impedance variation of said second single bi-directional electromagnetic transceiving coil of said second communicating unit, to thereby detect reception of the transmitted data signal at said first communicating unit.

12. A system as claimed in claim 1, wherein said first communicating unit further comprises:

data processing means, connected to said carrier wave generating means and said detection means, for processing said data to be transmitted by said tone burst signal, including said carrier wave signal, and for receiving said data signal detected by said detection means.

13. A system, as claimed in claim 12, wherein said second communicating unit further comprises:

data processing means, connected to said switching means and said second electromagnetic transducing means, for processing said data signal to be transmitted to said first communicating unit in connection with said impedance variation and for receiving said tone burst signal as data transmitted to said second communicating unit via said second electromagnetic transducing means.

* * * * *